US012798677B2

(12) United States Patent
Choi

(10) Patent No.: US 12,798,677 B2
(45) Date of Patent: Nov. 17, 2026

(54) VEHICLE STRUCTURE

(71) Applicants: Hyundai Motor Company, Seoul (KR); Kia Corporation, Seoul (KR)

(72) Inventor: Ji Ho Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 310 days.

(21) Appl. No.: 18/609,684

(22) Filed: Mar. 19, 2024

(65) Prior Publication Data

US 2025/0171090 A1 May 29, 2025

(30) Foreign Application Priority Data

Nov. 28, 2023 (KR) ........................ 10-2023-0168474

(51) Int. Cl.

*B62D 21/03* (2006.01)
*B60K 1/04* (2019.01)
*B62D 25/02* (2006.01)
*B62D 33/06* (2006.01)

(52) U.S. Cl.

CPC ................ *B62D 21/03* (2013.01); *B60K 1/04* (2013.01); *B62D 25/025* (2013.01); *B62D 33/06* (2013.01); *B60K 2001/0405* (2013.01)

(58) Field of Classification Search

CPC ...... B62D 25/025; B62D 21/03; B62D 33/06; B62D 21/02; B60K 2001/0438; B60K 1/04; B60K 2001/0405
USPC ..................................................... 296/190.08
See application file for complete search history.

(56) References Cited

U.S. PATENT DOCUMENTS 3,068,038 A * 12/1962 Douglass, Jr. ......... B62D 33/08 296/183.1
2021/0253168 A1* 8/2021 Jung ...................... B62D 21/03
2022/0219522 A1 7/2022 Kimura et al.
2024/0017770 A1 1/2024 Yoshida

FOREIGN PATENT DOCUMENTS

JP 3475720 B2 * 12/2003
JP 2015116972 A 6/2015
JP 2022086647 A 6/2022
KR 19980019483 U 7/1998
KR 200233382 Y1 12/2001
KR 102506239 B1 3/2023

OTHER PUBLICATIONS

Nakagome et al., Japanese Pat. No. JP 3475720 B2, English translation dated 2026. (Year: 2003).*

* cited by examiner

*Primary Examiner* — Caroline N Butcher
(74) *Attorney, Agent, or Firm* — Slater Matsil, LLP

(57) ABSTRACT

A vehicle body includes a cab, a pair of cab side sills disposed on each side of the cab, respectively, a pair of side members coupled to rear ends of the pair of cab side sills, respectively, a pair of rear side sills disposed on an outside of the pair of side members, respectively, and a pair of side extension members disposed along a transverse direction of the vehicle body to connect the pair of side members and the pair of rear side sills, respectively.

20 Claims, 11 Drawing Sheets

VEHICLE STRUCTURE

CROSS-REFERENCE TO RELATED APPLICATIONS

This application claims the benefit of Korean Patent Application No. 10-2023-0168474, filed on Nov. 28, 2023, which application is hereby incorporated herein by reference.

TECHNICAL FIELD

The present disclosure relates to a vehicle structure.

BACKGROUND

A chassis cab vehicle consists of a chassis and a cab, and no separate body components are provided behind the cab at the front of the vehicle. A chassis cab vehicle is configured so that rear loading items such as deck beds or containers can be selected and mounted at the rear of the cab.

When the chassis cab vehicle as described above is configured as an electric vehicle, a battery pack may be mounted on the lower side of the vehicle body. It is desirable to increase the payload of such a battery pack as much as possible to ensure sufficient vehicle range, and the battery pack needs to be provided adequate protection in case of a vehicle collision, etc.

The description provided above as background information of embodiments of the present disclosure is just for helping understand the background of the present disclosure and should not be construed as being publicly available.

SUMMARY

The present disclosure relates to a vehicle structure. Particular embodiments relate to a structure of a chassis cab vehicle with a battery pack mounted on the lower side thereof.

Embodiments of the present disclosure can solve problems in the art, and embodiments of the present disclosure provide a vehicle structure that allows a chassis cab vehicle with a battery pack mounted thereon to be equipped with as large a capacity battery pack as possible, while effectively protecting the battery pack in the event of a vehicle collision so that the vehicle range is increased and crash safety is improved, thereby maximizing the marketability of the vehicle.

The technical problems addressable by embodiments of the present disclosure are not limited to those mentioned above, and other problems not mentioned will be clearly understood by those skilled in the art from the description below.

According to an embodiment of the present disclosure, there is provided a vehicle structure including a rear side sill provided on an outside of each of two side members to be connected to a rear of a cab side sill provided on each side of a cab and a side extension member provided long along a transverse direction of a vehicle body to connect each of the side members and the rear side sill.

A center cross member may be provided to connect the side members on opposite sides of the vehicle body to each other, and the side extension member may be disposed on the same straight line as the center cross member along the transverse direction of the vehicle body.

The center cross member and the side extension member may each have a closed cross-section that extends linearly along the transverse direction of the vehicle body.

The center cross member and the side extension member may each have a u-shaped lower member and an n-shaped upper member combined with each other to form the closed cross-section.

A battery pack may be provided below the side members, and a total length of the center cross member and the side extension member may be larger than a width of the battery pack.

A pack side member at each end of the battery pack may be fixed to the cab side sill and the rear side sill.

A rear end of the rear side sill may extend longer rearward than a rear end of the battery pack.

A leaf spring may be installed at a rear of the battery pack, a plurality of the center cross members and the side extension members may be provided, and the rear end of the rear side sill may be coupled to the side extension member on which a front portion of the leaf spring is mounted among the plurality of side extension members.

Each of the side members at a rear of the cab may be configured to have a closed cross-sectional structure with a top height equal to that of each of the center cross members and the side extension members.

A rear loading item may be mounted on the side members at the rear of the cab, and on a lower side of a mounting panel of the rear loading item, a plurality of support cross members may be provided to overlap upper sides of the center cross members and the side extension members.

Any of the support cross members that overlaps the upper side of any of the side extension members may be provided longer than the width of the battery pack and may extend at least to an upper side of the rear side sill.

Any of the support cross members that does not overlap with any of the side extension members may be provided with a length extending at least to upper sides of the side members.

A mounting bolt penetrating the mounting panel and any of the support cross members may be coupled to any of the side extension members or the side members to secure the rear loading item to upper sides of the side members.

The mounting bolt coupled to the side extension members may be coupled to the side extension members at a location between the rear side sill and battery modules accommodated horizontally in the battery pack.

The side extension member on which the front portion of the leaf spring is mounted has a built-in bulkhead that supports an upper front portion of the leaf spring, and the mounting bolt is coupled to the side extension members through the bulkhead.

A rear portion of the leaf spring may be mounted on a rear mounting member protruding on each of opposite sides of the side members, and the mounting bolt may be coupled to the rear mounting member at an upper rear portion of the leaf spring.

The mounting bolt may be coupled to the side members.

A plurality of pipe members through which the mounting bolt penetrates may be provided between the mounting panel and the support cross members to support the mounting panel and the support cross members in vertical directions.

According to embodiments of the present disclosure, by allowing a chassis cab vehicle with a battery pack mounted thereon to be equipped with as large a capacity battery pack as possible, while effectively protecting the battery pack in the event of a vehicle collision, the vehicle range can be increased and crash safety can be improved, thereby maximizing the marketability of the vehicle.

The effects of embodiments of the present disclosure are not limited to that described above, and other effects not mentioned will be clearly understood by those skilled in the art from the description below.

DETAILED DESCRIPTION OF ILLUSTRATIVE EMBODIMENTS

Figure 1:
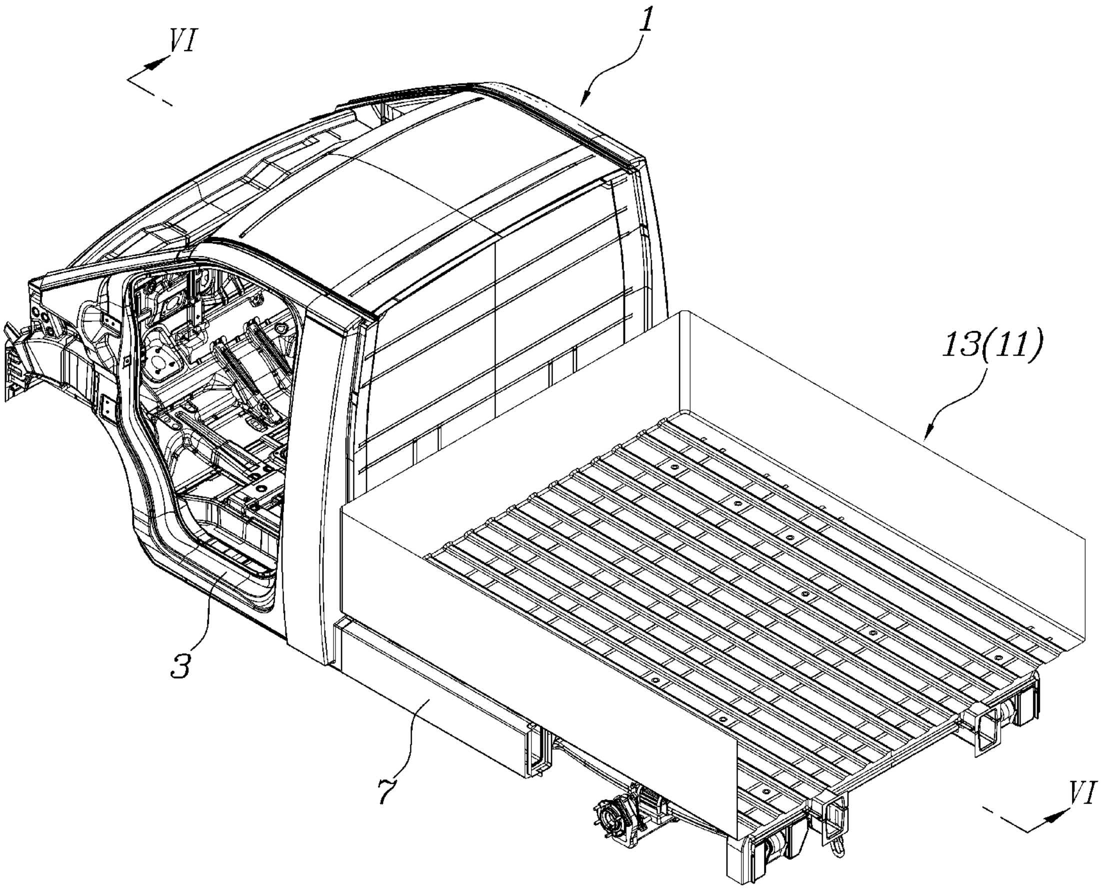
FIG. 1 is a view showing the structure of a chassis cab vehicle according to embodiments of the present disclosure.
Figure 2:
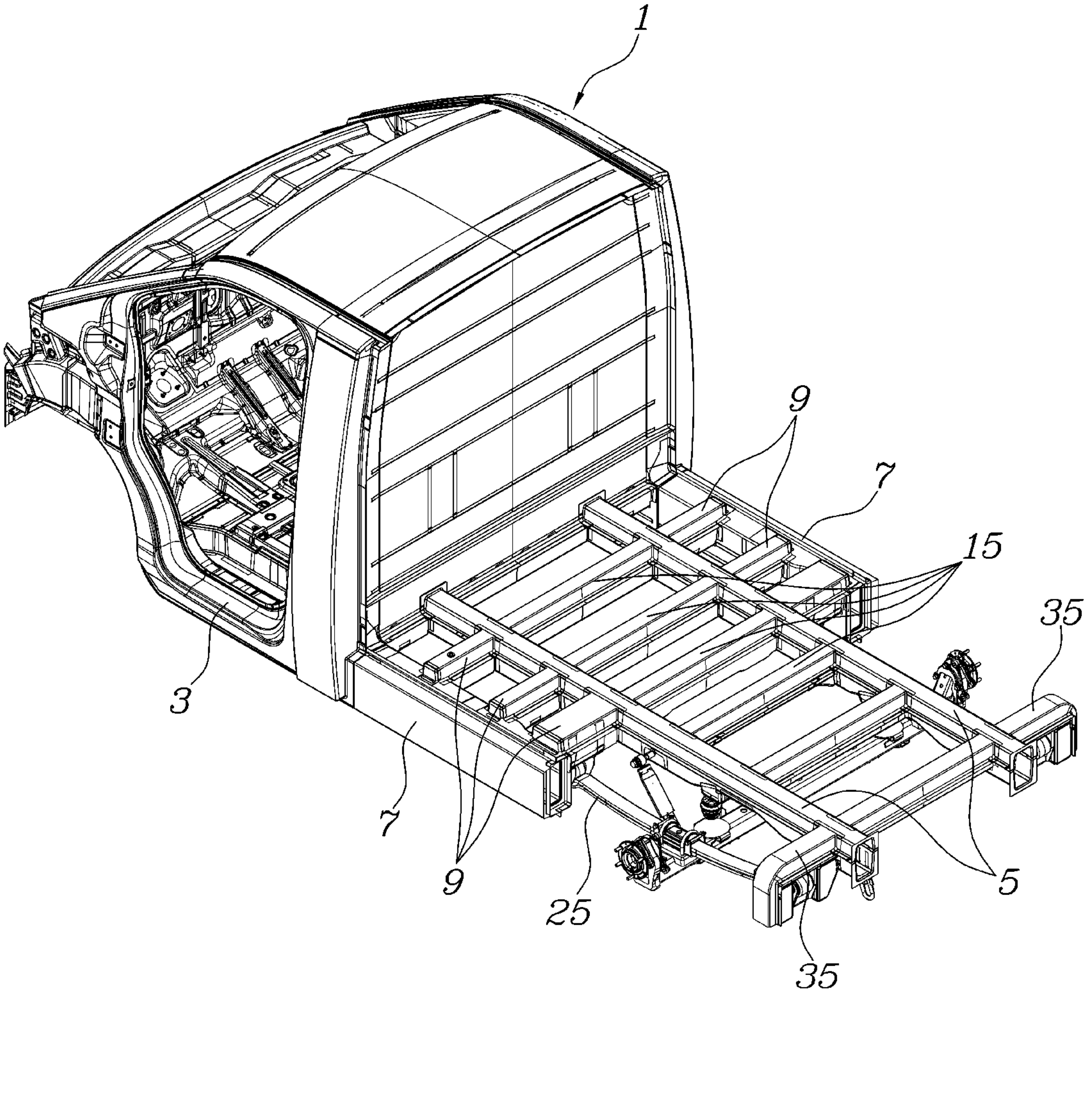
FIG. 2 is a view showing a state in which a deck bed, which is a type of rear loading item at the rear of a cab in FIG. 1, is removed.
Figure 3:
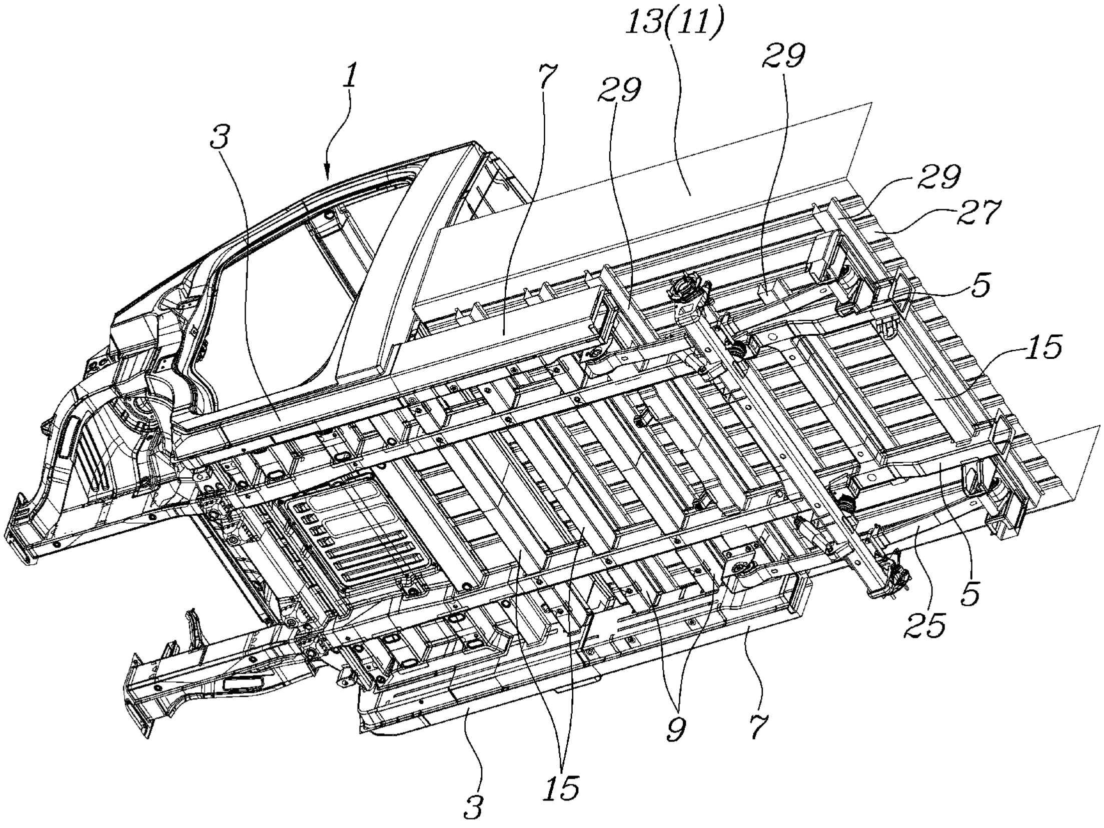
FIG. 3 is a view of the vehicle in FIG. 1 observed from below.
Figure 4:
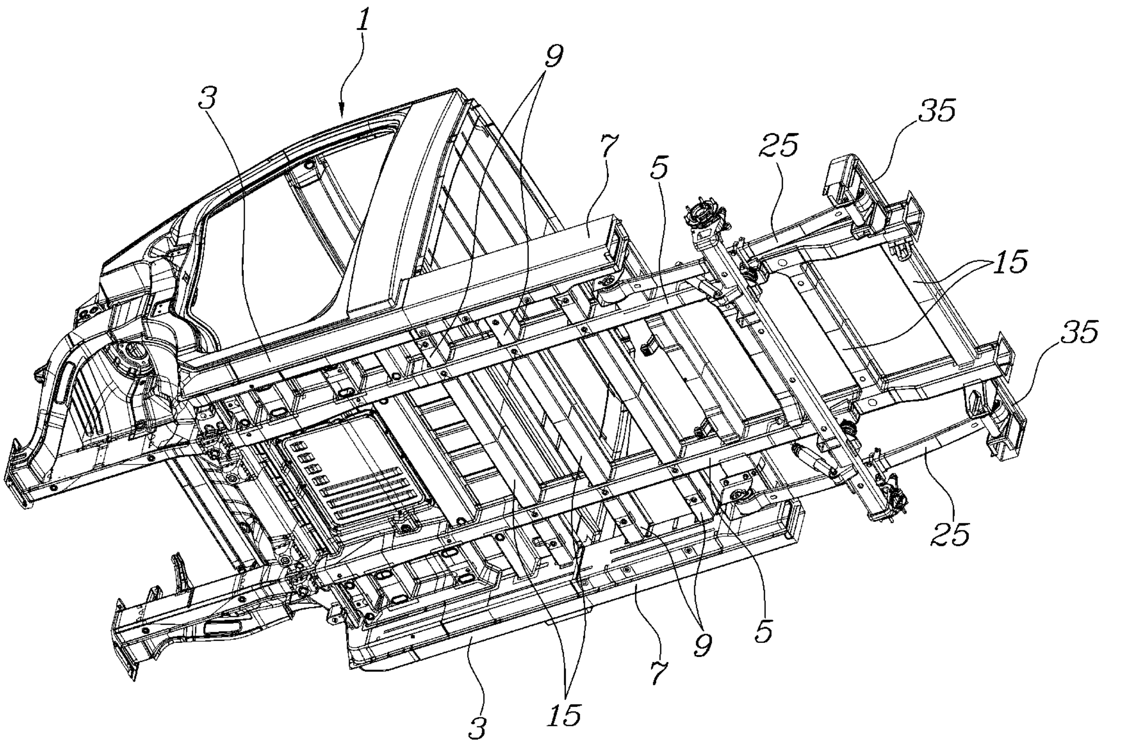
FIG. 4 is a view showing a state in which the deck bed in FIG. 3 is removed.
Figure 5:
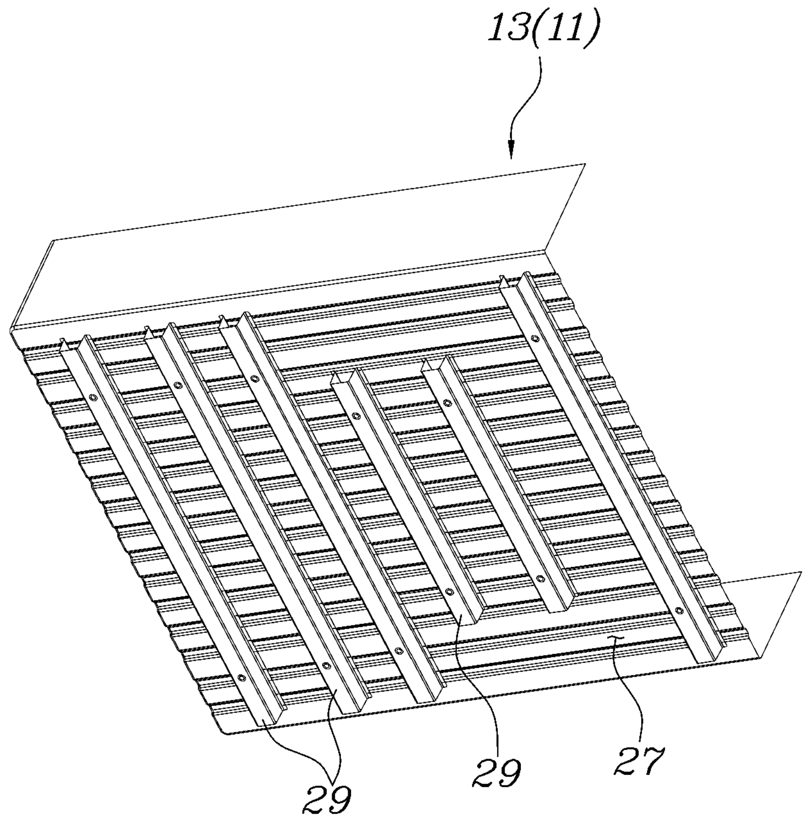
FIG. 5 is a view showing only the deck bed in FIG. 3.

Hereafter, embodiments of the present disclosure will be described in detail with reference to the accompanying drawings, and the same or similar components are given the same reference numerals regardless of the figure number and are not repeatedly described.

The terms "module" and "unit" that are used for components in the following description are used only for the convenience of description without having discriminate meanings or functions.

In the following description, if it is decided that the detailed description of known technologies related to the present disclosure makes the subject matter of the embodiments described herein unclear, the detailed description is omitted. Furthermore, the accompanying drawings are provided only for easy understanding of the embodiments disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first", "second", etc. may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or it may be connected to or coupled to another element, having the other element intervening therebetween. On the other hand, it should be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprise" are "have" used in this specification specify the presence of stated features, steps, operations, components, parts, or a combination thereof, but do not preclude the presence or addition of one or more other features, numerals, steps, operations, components, parts, or a combination thereof.

Referring to FIGS. 1 to 11, a vehicle structure according to an embodiment of the present disclosure includes rear side sills 7 provided on the outside of side members 5 to be connected to the rear of cab side sills 3 provided on opposite sides of a cab 1, and side extension members 9 provided long along the transverse direction of a vehicle body to connect the side members 5 and the rear side sills 7.

The cab 1 at the front of a vehicle includes the driver's seat inside and is provided with the cab side sills 3 at the lower ends of opposite sides, and a rear loading item 11 is mounted on the side members 5 at the rear.

At this time, the rear loading item 11 is used as a general term for various devices such as containers and deck beds. In the embodiment, an example of mounting a deck bed 13 as a rear loading item 11 is explained, and embodiments of the present disclosure may be applied to vehicles equipped with all types of rear loading items 11.

Although conventional chassis cab vehicles are not equipped with rear side sills 7, in embodiments of the present disclosure, as described above, the rear side sills 7 and the side extension members 9 are configured to provide greater rigidity in the event of an accident such as a side collision of a vehicle.

In the embodiment, center cross members 15 are provided between the side members 5 on opposite sides of the vehicle body to connect the side members 5, and the side extension members 9 are disposed on the same straight line as the center cross members 15 along the transverse direction of the vehicle body.

In particular, each of the center cross members 15 and the side extension members 9 has a closed cross-section that extends linearly along the transverse direction of the vehicle body.

In addition, the side member 5 at the rear of the cab is formed to have a closed cross-sectional structure with a top height equal to that of the center cross member 15 and the side extension member 9.

In the embodiment, the center cross member 15 and the side extension member 9 each have a structure in which a u-shaped lower member 17 and an n-shaped upper member 19 are combined to form the closed cross-section, and the side member 5 may also be formed to have a closed cross-sectional structure similar to this.

That is, while conventional chassis cab vehicles are equipped with only side members 5 and center cross members 15, and these side members 5 and center cross members 15 are also generally composed of only u-shaped members with an open upper side, in embodiments of the present disclosure, the side members 5 and the center cross members 15 are all configured to form a closed cross-section. In addition, by further providing the side extension members 9, the rear side sills 7 are firmly supported as the side extension members 9 form a shape that extends the closed cross-section of the center cross members 15 in the transverse direction of the vehicle body, enhancing the crash performance of a vehicle.

For reference, the side members 5 extend through the lower side of the cab 1 to the front of the vehicle, forming the main frame of the vehicle body.

Figure 6:
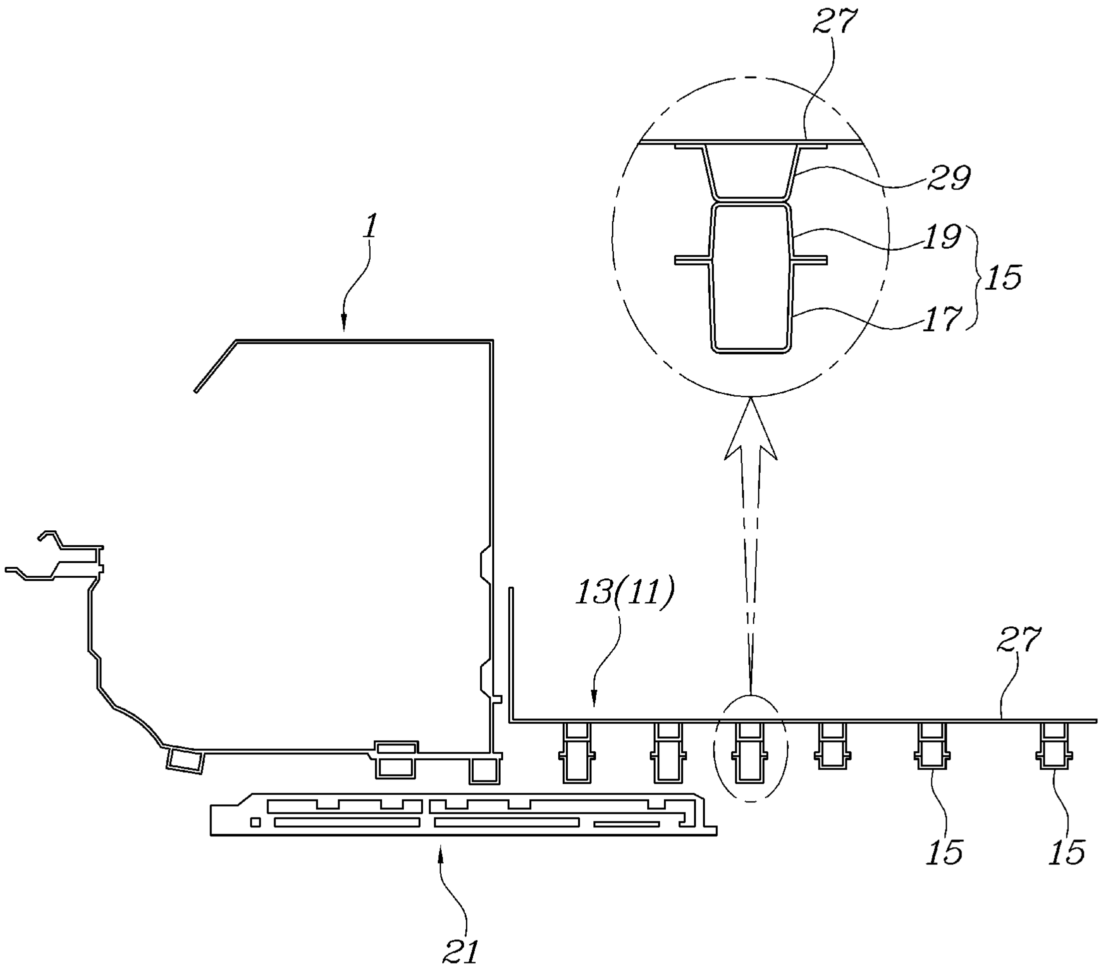
FIG. 6 is a view a cross-sectional view taken along line VI-VI of FIG. 1, with a battery pack mounted.
Figure 7:
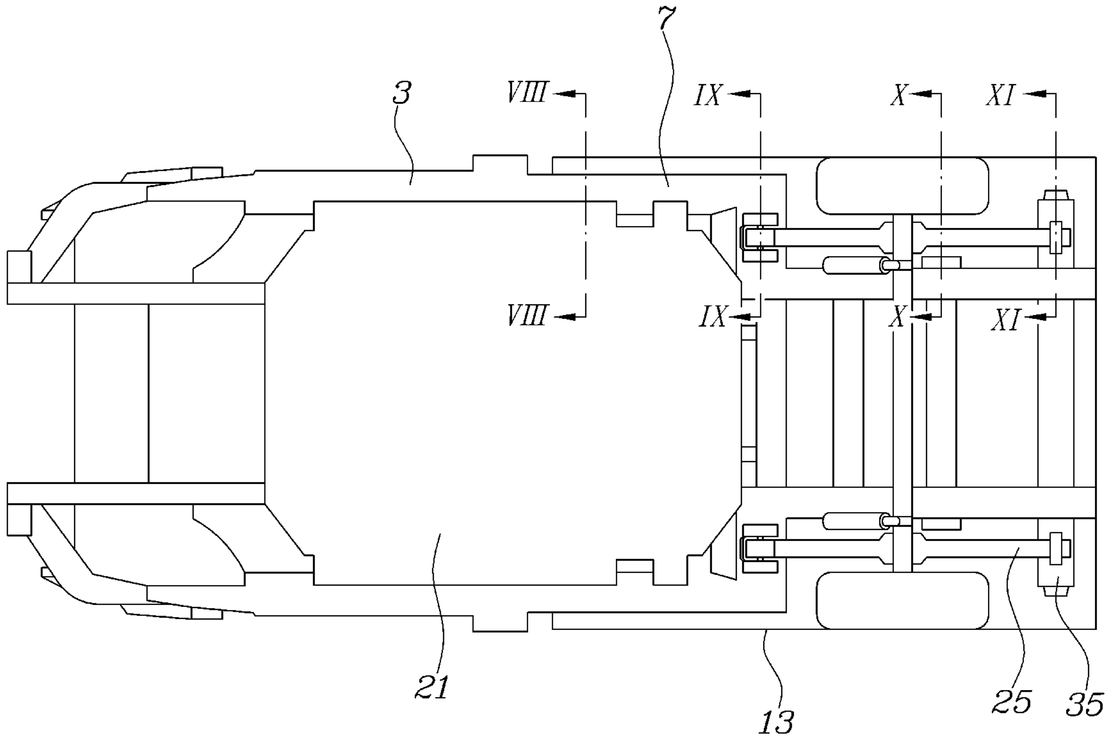
FIG. 7 is a bottom view of the vehicle of FIG. 1.

In addition, as shown in FIGS. 6 and 7, a battery pack 21 may be installed on the lower side of the vehicle of embodiments of the present disclosure.

That is, the battery pack 21 is provided below the side members 5, and the total length of the center cross member 15 and the side extension member 9 is formed to be larger than the width of the battery pack 21.

Pack side members 6 at opposite ends of the battery pack 21 are fixed to the cab side sills 3 and the rear side sills 7.

Accordingly, in the event of an accident such as a side collision of a vehicle, the battery pack 21 is not directly exposed to external shock due to the cab side sills 3, the rear side sills 7, the side extension members 9, the side members 5, and the center cross members 15, and the battery pack 21 may be safely protected.

In particular, embodiments of the present disclosure make it possible to increase the size of the battery pack 21 that may be mounted on a vehicle without being exposed to external shock by configuring the rear side sills 7 and the side extension members 9 as described above, and as a result, increase the range of a vehicle by mounting more battery modules 23.

The rear ends of the rear side sills 7 extend longer rearward than the rear end of the battery pack 21, allowing the battery pack 21 to be completely protected from vehicle side collisions, etc.

Meanwhile, leaf springs 25 are installed at the rear of the battery pack 21, the center cross members 15 and the side extension members 9 are provided in plurality, and the rear ends of the rear side sills 7 are coupled to the side extension members 9 on which the front portions of the leaf springs 25 are mounted among the plurality of side extension members 9.

Thus, a structure that may more firmly support the front portions of the leaf springs 25 is formed.

The rear loading item 11 is mounted on the side members 5 at the rear of the cab, and on the lower side of a mounting panel 27 of the rear loading item 11, support cross members 29 are provided that overlap the upper sides of the center cross members 15 and the side extension members 9.

Among the support cross members 29, the support cross member 29 that overlaps the upper sides of the side extension members 9 is provided longer than the width of the battery pack 21 and extends at least to the upper sides of the rear side sills 7, providing additional rigidity to protect the battery pack 21 in the event of vehicle side collisions, etc.

In addition, among the support cross members 29, the support cross member 29 that does not overlap with the side extension members 9 is provided with a length extending at least to the upper sides of the side members 5.

That is, in the embodiment, the support cross members 29 located near suspensions including the leaf springs 25 do not overlap the side extension members 9 and extend to the upper sides of the side members 5 while overlapping with the center cross members 15 but extend just enough to not interfere with the suspensions.

A mounting bolt 31 penetrating the mounting panel 27 and the support cross member 29 is coupled to the side extension member 9 or the side member 5 to secure the rear loading item 11 to the upper side of the side member 5.

Figure 8:
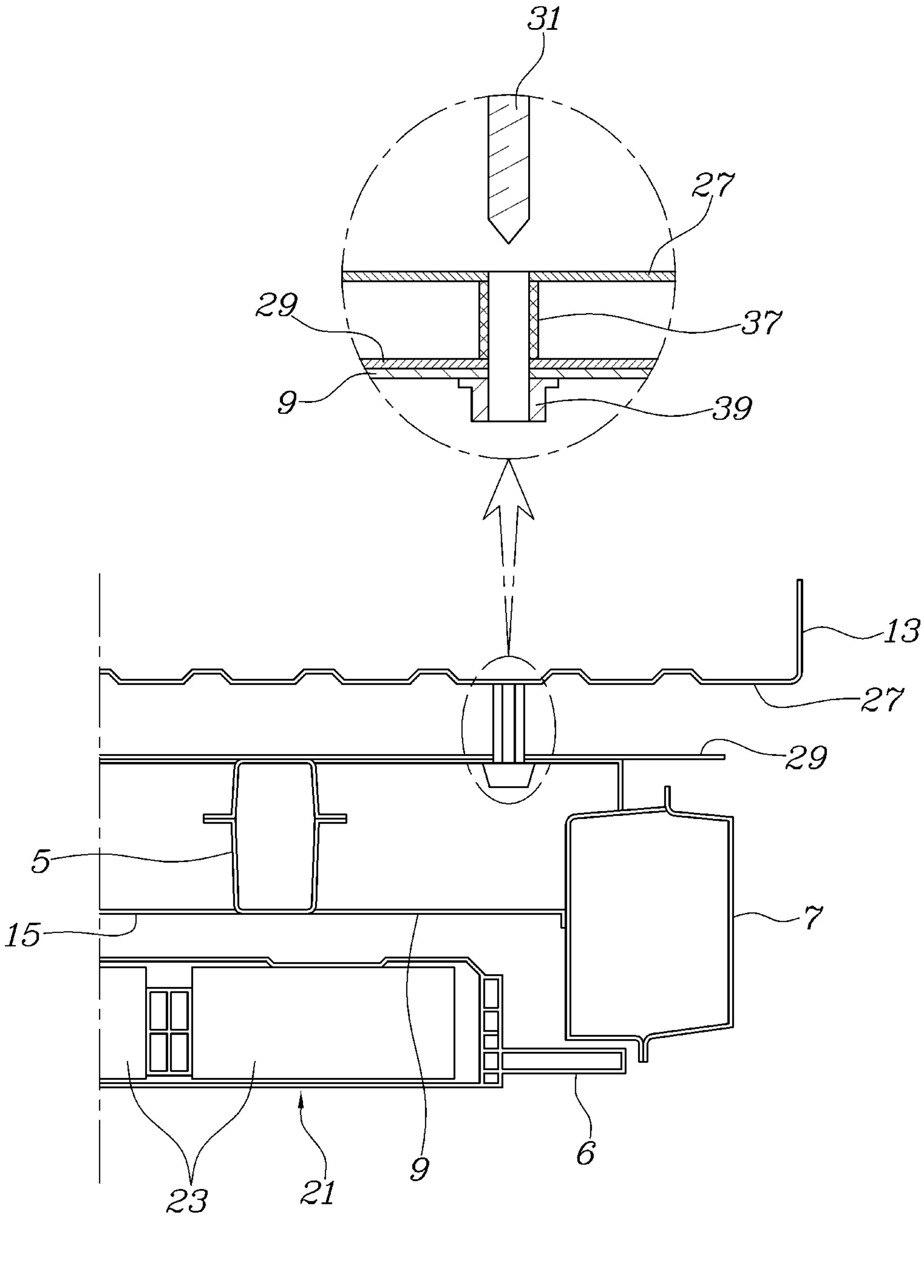
FIG. 8 is a cross-sectional view taken along line VIII-VIII of FIG. 7.

As shown in FIG. 8, the mounting bolt 31 is coupled to the side extension member 9 between the rear side sill 7 and the battery modules 23 accommodated in the battery pack 21 in the horizontal direction.

Therefore, the rear side sills 7 and the portions of the side extension members 9 located outside based on the area where the mounting bolt 31 is fastened are deformed in the event of a side collision accident of a vehicle, etc., and function as shock absorbing parts, whereas the remaining portions of the side extension members 9, the side members 5, and the center cross members 15 located inside based on the area where the mounting bolt 31 is fastened provide rigidity to resist impact force input from the sides of a vehicle and function as parts to protect the battery modules 23 accommodated in the battery pack 21.

Figure 9:
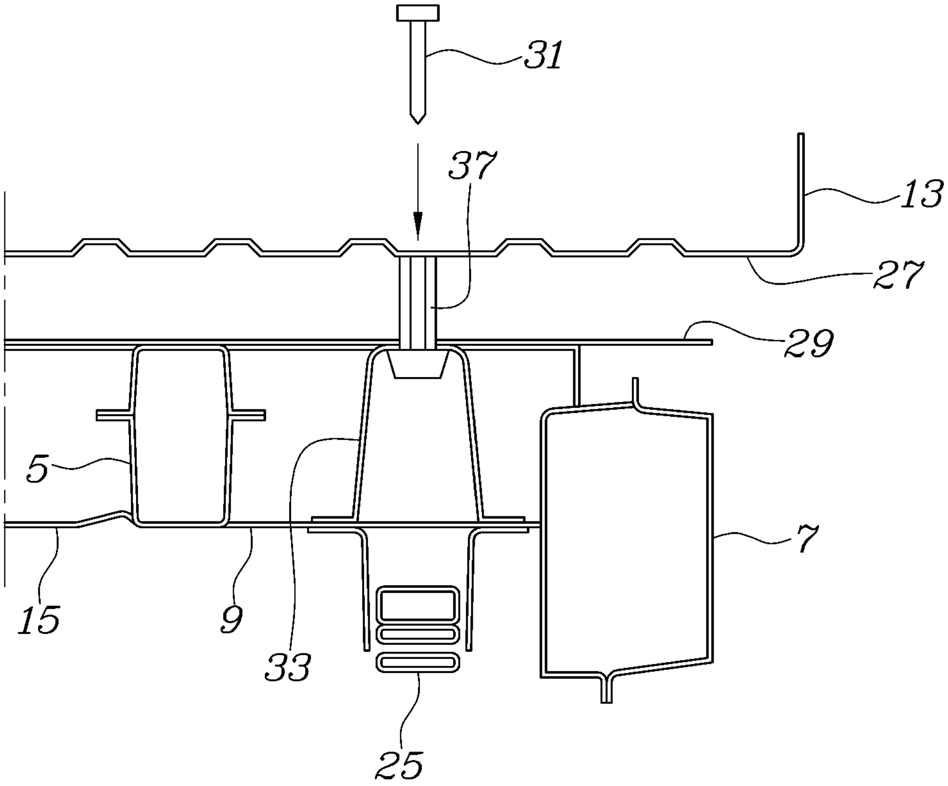
FIG. 9 is a cross-sectional view taken along line IX-IX of FIG. 7.

Referring to FIG. 9, the side extension member 9, on which the front portion of the leaf spring 25 is mounted, has a built-in bulkhead 33 that supports the upper front portion of the leaf spring 25, and the mounting bolt 31 is coupled to the side extension member 9 through the bulkhead 33.

Figure 11:
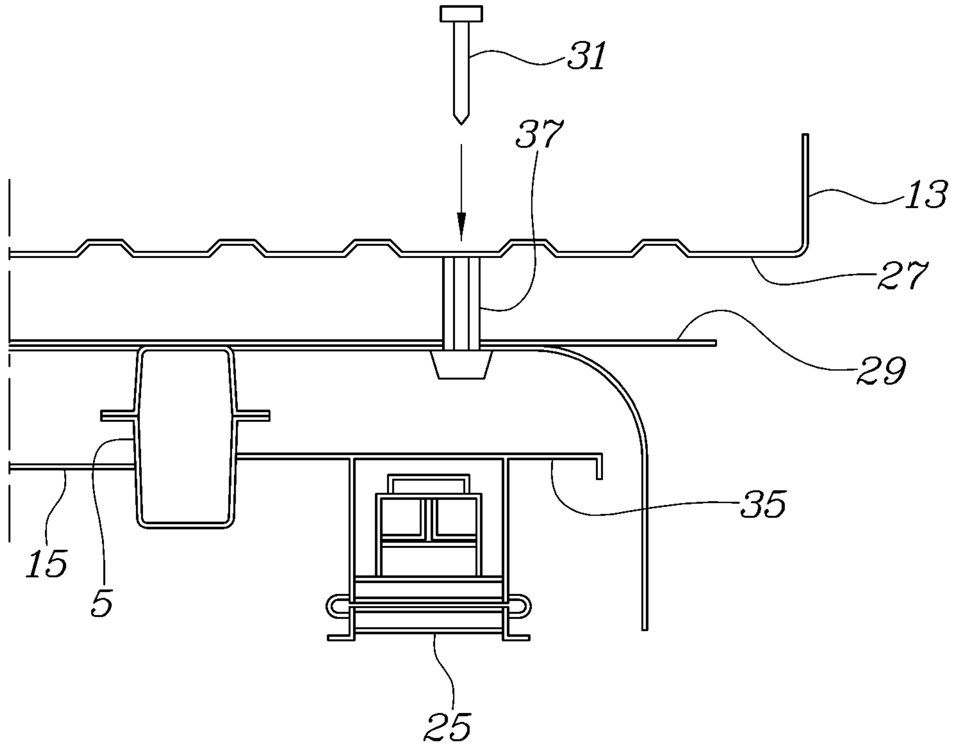
FIG. 11 is a cross-sectional view taken along line XI-XI of FIG. 7.

In addition, the rear portion of the leaf spring 25 is mounted on a rear mounting member 35 that protrudes on opposite sides of the side members 5, and the mounting bolt 31 is coupled to the rear mounting member 35 at the upper rear portion of the leaf spring 25, as shown in FIG. 11.

Accordingly, the areas where the front and rear portions of the leaf spring 25 are mounted are in a more firmly supported state.

Some of the mounting bolts 31 are coupled to the side members 5.

Figure 10:
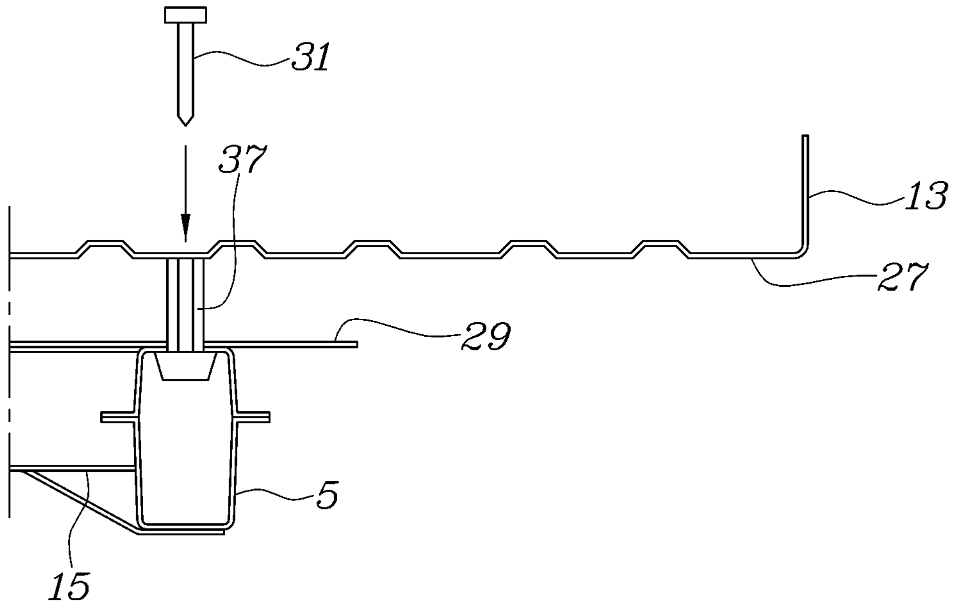
FIG. 10 is a cross-sectional view taken along line X-X of FIG. 7.

That is, as shown in FIG. 10, in areas where there is a risk of interference with suspension parts such as the leaf springs 25, the length of the support cross member 29 is appropriately limited to avoid interference with the suspension parts, and the mounting bolts 31 are coupled to the side members 5 to firmly secure the rear loading item 11 on the side members 5.

A plurality of pipe members 37 through which the mounting bolt 31 penetrates is provided between the mounting panel 27 and the support cross members 29 to support the mounting panel 27 and the support cross members 29 in the vertical direction.

Furthermore, a weld nut 39, etc. may be provided on the side extension member 9, the side member 5, the bulkhead 33, and the rear mounting member 35 so that the mounting bolt 31 is fastened.

Although embodiments of the present disclosure were provided above in relation to specific embodiments shown in the drawings, it is apparent to those skilled in the art that the embodiments of the present disclosure may be changed and modified in various ways without departing from the scope of the present disclosure, which is provided in the following claims.

What is claimed is:

1. A vehicle structure comprising:
- a cab;
- a pair of cab side sills disposed on each side of the cab, respectively;
- a pair of side members longitudinally extending in a front and rear direction of a vehicle body, positioned on an inner side of the vehicle body with respect to the pair of cab side sills respectively;
- a pair of rear side sills disposed on an outside of the pair of side members and coupled to a rear of the pair of cab side sills, respectively;
- a pair of side extension members disposed along a transverse direction of the vehicle body to connect the pair of side members and the pair of rear side sills, respectively; and
- a center cross member connecting the pair of side members on opposite sides of the vehicle body to each other, wherein the center cross member extends continuously between the pair of side members and wherein the pair of side extension members is disposed on the same straight line as the center cross member along the transverse direction of the vehicle body.

2. The vehicle structure of claim 1, wherein the center cross member and the pair of side extension members each have a closed cross-section that extends linearly along the transverse direction of the vehicle body.

3. The vehicle structure of claim 2, wherein the center cross member and the pair of side extension members each have a u-shaped lower member and an n-shaped upper member combined with each other to define the closed cross-section.

4. The vehicle structure of claim 2, further comprising a battery pack disposed below the pair of side members, wherein a total length of the center cross member and the pair of side extension members on each end of the center cross member, respectively, is larger than a width of the battery pack.

5. The vehicle structure of claim 4, further comprising a pair of pack side members at opposite ends of the battery pack, respectively, wherein the pair of pack side members is fixed to the pair of cab side sills and the pair of rear side sills, respectively.

6. The vehicle structure of claim 4, wherein rear ends of the pair of rear side sills extend longer rearward than a rear end of the battery pack.

7. The vehicle structure of claim 6, wherein:

a pair of leaf springs is disposed at a rear of the battery pack;

the center cross member and the pair of side extension members are provided in plural; and the rear ends of the pair of rear side sills are coupled to the pair of side extension members on which front portions of the pair of leaf springs are mounted among the plural pairs of side extension members.

8. The vehicle structure of claim 7, wherein each side member of the pair of side members has a closed cross-sectional structure with a top height equal to that of each of the center cross members and the pair of side extension members.

9. A vehicle structure comprising:

a cab;

a pair of cab side sills disposed on each side of the cab, respectively;

a pair of side members longitudinally extending in a front and rear direction of a vehicle body, positioned on an inner side of the vehicle body with respect to the pair of cab side sills respectively;

a pair of rear side sills disposed on an outside of the pair of side members and coupled to a rear of the pair of cab side sills, respectively;

a pair of side extension members disposed along a transverse direction of the vehicle body to connect the pair of side members and the pair of rear side sills, respectively;

a center cross member connecting the pair of side members on opposite sides of the vehicle body to each other, the center cross member extending continuously between the pair of side members;

a battery pack disposed below the pair of side members;

a pair of leaf springs disposed at a rear of the battery pack, wherein front portions of the pair of leaf springs are mounted on the pair of side extension members;

a rear loading item mounted on the pair of side members at a rear of the cab; and a plurality of support cross members disposed to overlap upper sides of the center cross member and the pair of side extension members on a lower side of a mounting panel of the rear loading item;

wherein the pair of side extension members is disposed on the same straight line as the center cross member along the transverse direction of the vehicle body;

wherein the center cross member and the pair of side extension members each have a closed cross-section that extends linearly along the transverse direction of the vehicle body; and wherein a total length of the center cross member and the pair of side extension members on each end of the center cross member, respectively, is larger than a width of the battery pack.

10. The vehicle structure of claim 9, wherein the support cross members that overlap the upper sides of the pair of side extension members are longer than the width of the battery pack and extend to upper sides of the pair of rear side sills.

11. The vehicle structure of claim 9, wherein the support cross members that do not overlap with the side extension members have a length extending to upper sides of the pair of side members.

12. The vehicle structure of claim 9, wherein mounting bolts are configured to secure the rear loading item to upper sides of the pair of side members by penetrating the mounting panel and any of the support cross members coupled to any of the pair of side extension members or the pair of side members.

13. The vehicle structure of claim 12, wherein the mounting bolts are coupled to the side extension members at a location between the pair of rear side sills and battery modules accommodated horizontally in the battery pack.

14. The vehicle structure of claim 12, wherein:

the pair of side extension members on which the front portions of the pair of leaf springs are mounted has a built-in bulkhead configured to support upper front portions of the pair of leaf springs; and the mounting bolts are coupled to the side extension members through the bulkhead.

15. The vehicle structure of claim 14, wherein:

rear portions of the pair of leaf springs are mounted on a rear mounting member protruding on each of opposite sides of the pair of side members; and the mounting bolts are coupled to the rear mounting member at upper rear portions of the pair of leaf springs.

16. The vehicle structure of claim 12, wherein the mounting bolts are coupled to either side member of the pair of side members.

17. The vehicle structure of claim 12, further comprising a plurality of pipe members disposed between the mounting panel and the support cross members, wherein the plurality of pipe members is configured to support the mounting panel and the support cross members in vertical directions, and wherein the mounting bolts penetrate the plurality of pipe members.

18. A vehicle structure comprising:

a cab;

a pair of cab side sills disposed on each side of the cab, respectively;

a pair of side members longitudinally extending in a front and rear direction of a vehicle body, positioned on an inner side of the vehicle body with respect to the pair of cab side sills respectively;

a pair of rear side sills disposed on an outside of the pair of side members and coupled to a rear of the pair of cab side sills, respectively;

a pair of side extension members disposed along a transverse direction of the vehicle body to connect the pair of side members and the pair of rear side sills, respectively; and a center cross member connecting the pair of side members on opposite sides of the vehicle body to each other, wherein the pair of side extension members is disposed on the same straight line as the center cross member along the transverse direction of the vehicle body, wherein the center cross member and the pair of side extension members each have a closed cross-section that extends linearly along the transverse direction of the vehicle body, and wherein the center cross member and the pair of side extension members each have a u-shaped lower member and an n-shaped upper member combined with each other to define the closed cross-section.

19. The vehicle structure of claim 18, further comprising a battery pack disposed below the pair of side members, wherein a total length of the center cross member and the pair of side extension members on each end of the center cross member, respectively, is larger than a width of the battery pack.

20. The vehicle structure of claim 19, further comprising a pair of pack side members at opposite ends of the battery pack, respectively, wherein the pair of pack side members is fixed to the pair of cab side sills and the pair of rear side sills, respectively.

* * * * *